United States Patent
Ban et al.

(10) Patent No.: US 6,769,623 B2
(45) Date of Patent: Aug. 3, 2004

(54) AUTOMOTIVE INTERNAL COMBUSTION ENGINE COOLING SYSTEM

(75) Inventors: Koichi Ban, Tokai (JP); Toshio Morikawa, Toyota (JP); Takashi Toyoshima, Obu (JP); Yoshio Miyata, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/425,683

(22) Filed: Apr. 28, 2003

(65) Prior Publication Data

US 2003/0200948 A1 Oct. 30, 2003

(30) Foreign Application Priority Data

Apr. 30, 1920 (JP) ....................................... 2002-128427

(51) Int. Cl.[7] .................................................. B60H 1/02
(52) U.S. Cl. ................................ 237/12.3 B; 123/41.14
(58) Field of Search ....................... 123/142.5 R, 41.06, 123/41.14, 41.15; 237/12.3 B (56) References Cited

U.S. PATENT DOCUMENTS 5,407,130 A * 4/1995 Uyeki et al. ........... 237/12.3 B
5,896,833 A * 4/1999 Aoki ....................... 123/41.14

FOREIGN PATENT DOCUMENTS

JP              10-71838          3/1998

* cited by examiner

Primary Examiner—Andrew M. Dolinar
Assistant Examiner—Katrina B. Harris
(74) Attorney, Agent, or Firm—Harness, Dickey & Pierce, PLC (57) ABSTRACT

A cooling system comprising a cooling water circuit 3a in which cooling water of an engine 1 circulates in a radiator 5, a hot water circuit 3c in which hot water circulates in a heater core 11, an air mixing door 12 for adjusting the volume of air which passes through the heater core, a heat storage element 7 provided in a bypass passage 6 for branching hot water into the heat core from the hot water circuit, a flow path selector valve 9 for adjusting the distribution of hot water to the heat storage element and the heater core, and a control unit 14 for controlling the operation of the air mixing door and the flow path selector valve, wherein the control unit controls the flow path selector valve such that the flow rate of hot water to be distributed to the heater core becomes larger than the flow rate of hot water to be distributed to the heat storage element, in the event that the volume of air passing through the heater core is equal to or larger than a predetermined value.

10 Claims, 9 Drawing Sheets

| OPERATION | WARMING-UP MODE | NORMAL OPERATING MODE | HEAT STORING MODE |
|---|---|---|---|
| | PUSH OUT HOT WATER WITH COOL WATER / SUPPLY HOT WATER TO ENGINE BLOCK SIDE | RETAIN COOL WATER WITHIN TANK / SUPPLY HOT WATER TO HEATER SIDE | SUPPLY HOT WATER TO HEAT STORAGE ELEMENT |
| SELECTOR VALVE | PATTERN A (ENGINE → HEAT STORAGE ELEMENT) | PATTERN B (ENGINE → HEATER) | PATTERN C (ENGINE → HEATER AND HEAT STORAGE ELEMENT) |
| SELECTOR VALVE OPERATING PATTERN | A | B | C |

AUTOMOTIVE INTERNAL COMBUSTION ENGINE COOLING SYSTEM

BACKGROUND OF THE INVENTION

1. Field of the Invention

The present invention relates to an automotive internal combustion engine cooling system which can reduce exhaust emissions and improve the fuel economy and the promptness of effective heating, when a water-cooled internal combustion engine (an engine) is started, by causing the temperature of an engine main body or of engine cooling water to be increased sufficiently at an early time after the engine is started.

2. Description of the Related Art

As a cooling system for attempting to promote the warm-up of a water-cooled internal combustion engine (an engine), there has been conventionally proposed a cooling system in which a heat storage tank, which stores cooling water flowing out of the engine while maintaining the temperature of the cooling water, is disposed in a cooling water circuit, whereby hot cooling water stored in the heat storage tank is introduced into the engine to thereby promote the warm-up of the engine.

As one conventional example, there exists an automotive internal combustion engine cooling system which was made known to the public by Japanese Unexamined Patent Publication No. 10-71838. According to this conventional system, while the engine is being warmed up, if the temperature of cooling water flowing out of the heat storage tank provided in the cooling water circuit is below a predetermined temperature (60° C.), all the hot cooling water stored in the heat storage tank is understood to have flowed out of the tank, and a cooling water inlet path is closed, whereas a bypass water path is opened, whereby of the cooling water flowing out of the engine, the cooling water whose temperature remains low immediately after the engine is started up, is temporarily stored in the heat storage tank. Thus, the cooling water, whose temperature remains low immediately after the engine is started up, is prevented from circulating within the engine thereby promoting the warming-up of the engine.

With this conventional cooling system, however, in the event that the cooling water flows into the heat storage tank when a heating performance is being required by a heater core (an air conditioner) which is provided in a cooling water circuit of the engine, the flow rate of cooling water (hot water) on a heater core side is reduced, leading to a risk of a problem that the temperature of air, which flows through the heater core to be let out into the passenger compartment, is lowered.

SUMMARY OF THE INVENTION

The present invention was made in view of these situations, and an object thereof is to provide an automotive internal combustion engine cooling system in which a heat storage element can secure a sufficient heat storing performance without deteriorating the air conditioning performance of a heater core.

According to the present invention, there is provided an automotive internal combustion engine cooling system in which cooling water for a water-cooled internal combustion engine is designed to be circulated by means of a pump, the automotive internal combustion engine cooling system comprising a cooling water circuit in which cooling water circulates in a radiator adapted to cool cooling water from the internal combustion engine, a hot water circuit in which hot water circulates in a heater core adapted to heat air to be let out into a passenger compartment using hot water from the internal combustion engine as a heat source, an air mixing door for adjusting the volume of air which passes through the heater core, a heat storage element bypass passage for passing hot water into the heater core from the hot water circuit, a heat storage element installed in the heat storage element bypass passage for storing hot water supplied from the internal combustion engine, a flow path selector valve for adjusting the distribution of hot water to the heat storage element and the heater core, and a control unit for controlling the operation of the air mixing door and the flow path selector valve, wherein the control unit controls the flow path selector valve such that the flow rate of hot water to be distributed to the heater core is increased as the volume of air passing through the heater core increases.

In addition, when the volume of air passing through the heater core is equal to or larger than a predetermined value, the control unit controls the flow path selector valve such that the flow rate of hot water to be distributed to the heater core becomes larger than the flow rate of hot water to be distributed to the heat storage element. According to the construction, the drawback inherent in the related art, that when the heating performance is required by the heater core, cooling water flows into the heat storage element, and the flow rate of hot water on the heater core side is reduced, whereby the temperature at air outlets is lowered largely, can be prevented.

Additionally, according to the present invention, there is provided an automotive internal combustion engine cooling system wherein the control unit controls the flow path selector valve such that the flow rate of hot water to be distributed to the heater core becomes zero when there exists almost no air to be distributed to the heater core. According to the construction, an efficient and sufficient heat storage can be secured at the heat storage element.

Furthermore, according to the present invention, there is provided an automotive internal combustion engine cooling system, wherein the control unit has a computing device for computing a required temperature at air outlets temperature (TAO) which is a target temperature of air to be let out into the passenger compartment, and wherein the control unit controls the flow path selector valve such that when the required temperature at air outlets exceeds a predetermined value, the flow rate of hot air to be distributed to the heater core becomes larger than the flow rate of hot water to be distributed to the heat storage element. According to the construction, the required temperature, at the air outlets into the passenger compartment, can be obtained.

Moreover, according to the present invention, there is provided an automotive internal combustion engine cooling system, wherein the control unit controls the flow path selector valve such that when the temperature of hot water located in the vicinity of the heater core is higher than a predetermined value, the flow rate of hot water to be distributed to the heat storage element becomes larger than the flow rate of hot water to be distributed to the heater core. According to the construction, a sufficient heat storing performance can be ensured without deteriorating the air conditioning performance.

In addition, according to the present invention, there is provided an automotive internal combustion engine cooling system, wherein the control unit controls the flow path selector valve such that when the engine speed is lower than a predetermined engine speed, the flow rate of hot water to be distributed to the heater core becomes larger than the flow rate of hot water to be distributed to the heat storage element. According to the construction, the vehicle can secure a sufficient temperature at air outlets even when the vehicle runs at a slow speed.

Additionally, according to the present invention, there is provided an automotive internal combustion engine cooling system, wherein the control unit controls the flow path selector valve such that when the vehicle speed is slower than a predetermined vehicle speed, the flow rate of hot water to be distributed to the heater core becomes larger than the flow rate of hot water to be distributed to the heat storage element. According to this construction, the vehicle can secure a sufficient temperature at the air outlets even when the vehicle runs at a slow speed.

Furthermore, according to the present invention, there is provided an automotive internal combustion engine cooling system, wherein a heat storing electric water pump is provided in the heat storage element bypass passage for passing hot water to the heat storage element, and wherein the control unit controls the heat storing electric water pump such that when the volume of air passing through the heater core is equal to or smaller than a predetermined value, the flow rate of hot water to be distributed to the heat storage element becomes larger than the flow rate of hot water to be distributed to the heater core. According to the construction, a sufficient heat storing performance can be secured without deteriorating the air conditioning performance.

Moreover, according to the present invention, there is provided an automotive internal combustion engine cooling system, wherein an electric water pump for a heater is provided in a passage for passing hot water to the heater core, and wherein the control units controls the electric water pump for a heater such that when the volume of air passing through the heater core is equal to or larger than a predetermined value, the flow rate of hot water to be distributed to the heater core becomes larger than the flow rate of hot water to be distributed to the heat storage element. According to the construction, a sufficient temperature at the air outlets can be ensured.

In addition, that the volume of air is equal to or larger than the predetermined value means that an opening degree of an air mixing door which controls a volume of air passing through the heater core is equal to or larger than a predetermined opening.

The present invention may be more fully understood from the description of preferred embodiments of the invention, as set forth below, together with the accompanying drawings.

DESCRIPTION OF THE PREFERRED EMBODIMENTS

Figure 1:
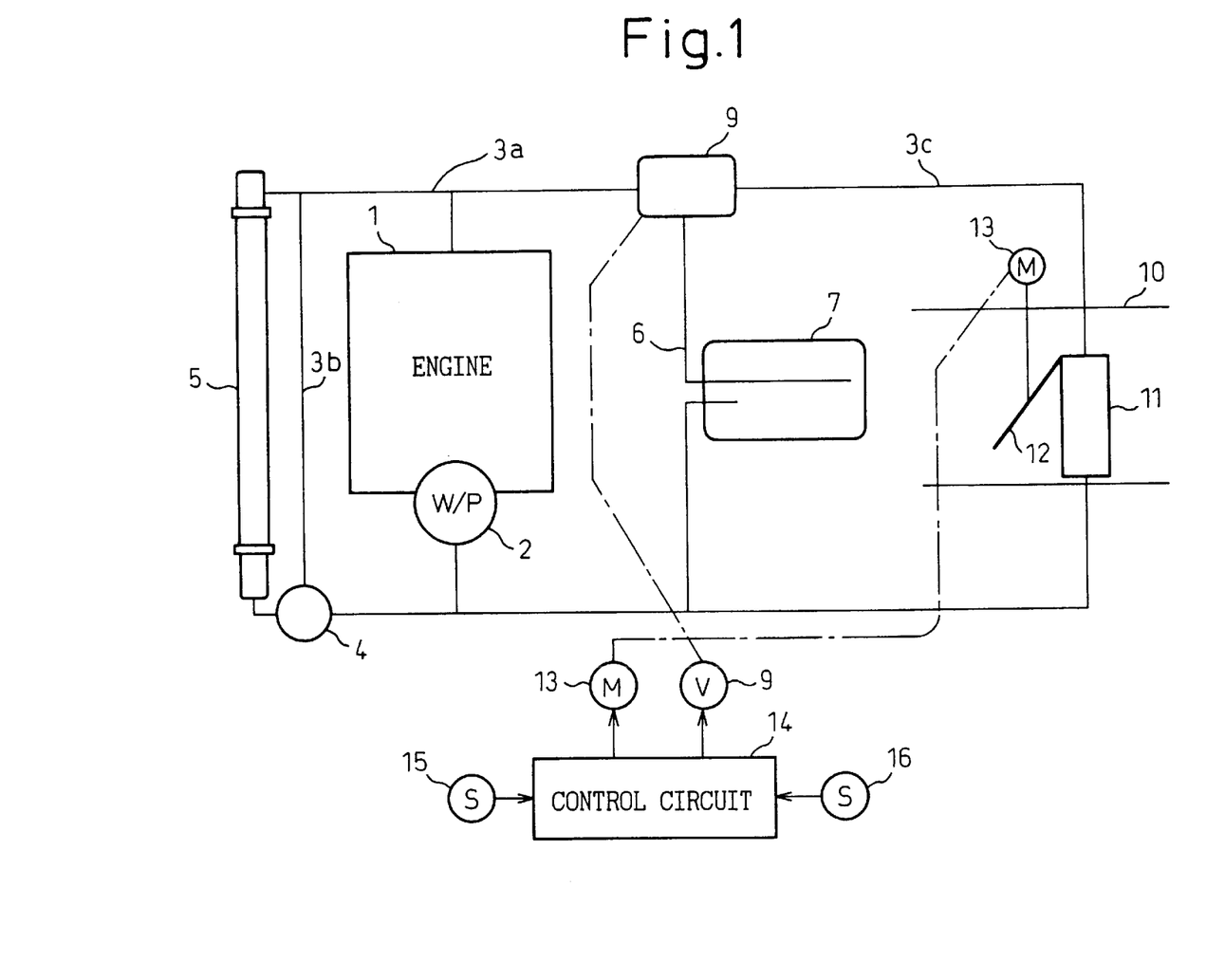
FIG. 1 shows an engine cooling water circuit and a hot water circuit of an automotive heat storage type heating device in an automotive internal combustion engine cooling system according to an embodiment of the present invention.

Referring to the accompanying drawings, an automotive internal combustion engine cooling system according to embodiments of the present invention will be described below. FIG. 1 shows a cooling water circuit $3a$ for a water-cooled internal combustion engine and a hot water circuit $3c$ of an automotive heat storage type heating device in an automotive internal combustion engine cooling system.

Reference numeral 1 denotes an engine for driving a vehicle, and reference numeral 2 denotes a water pump, driven by a driving force from the engine 1, to circulate cooling water. Part of the cooling water which has absorbed heat from the engine 1 flows into the engine cooling water circuit $3a$, and the remaining cooling water flows into the hot water circuit $3c$ of a heater core which is the automotive heating device. Reference numeral 5 denotes a radiator which functions as a cooling element for cooling the cooling water of the engine 1. In addition, a bypass passage $3b$ is provided in this cooling water circuit $3a$ which functions as a bypass passage for cooling water flowing in the radiator 5. Selection of these cooling water circuits $3a$, $3b$ is controlled by a thermostat 4. Incidentally, the selection of the cooling water circuits $3a$, $3b$ is controlled normally such that when the cooling water temperature is equal to or higher than a predetermined temperature, cooling water flows into the radiator 5, whereas when the cooling water temperature is lower than the predetermined temperature as is found when the temperature of cooling water is low, cooling water flows into the bypass circuit $3b$.

On the other hand, the heater core 11 is provided in the hot water circuit $3c$ of the automotive heating device. A heat storage element bypass passage 6 installing therein a heat storage element 7 is branched off on an upstream side of the heater core 11 so as to pass hot water returning to the heater core 11 from the hot water circuit $3c$ to the heat storage element 7 side. Namely, the heater core 11 and the heat storage element 7 are disposed in parallel with each other in the hot water circuit $3c$. A flow path selector valve 9 is provided at a branch point where an upstream side of the heater core 11 and an upstream side of the heat storage element 7 branch from each other so as to control the supply of hot water to the heater core 11 and the heat storage element 7.

The heat storage element 7 has a double tank construction, and a vacuum is produced in a space between two tanks in order to improve the heat insulation. Consequently, the temperature of a high-temperature hot water which flows thereinto is maintained after it has branched from the hot water circuit 3c in the heat storage element 7.

In addition, the flow path selector valve 9 is a rotary valve which is driven to rotate by an actuator such as, for example, a servo motor.

Reference numeral 10 denotes an air passage which constitutes part of an air conditioning unit, and a blower motor and a fan, and an evaporator of a refrigeration cycle, which are not shown, are provided in the air passage 10 upstream of the heater core 11 so as to adjust the volume of air passing through the air passage and cool air so passing as required. An air mixing door 12 is installed upstream of the heater core 11, and the opening of the air mixing door 12 is controlled according to air conditioning load conditions by a servo motor 13 so as to adjust the volume of cool air which bypasses the heater core 11 to thereby control the outlet temperature of air which is let out into the passenger compartment.

In addition, as shown in FIG. 1, a heat storage operation signal 15 and an air conditioning load signal 16 are inputted into a control circuit 14 which functions as a control unit to thereby control the operation of the flow path selector valve 9, the air mixing door 12 and the driving servo motor 13.

Figure 2:
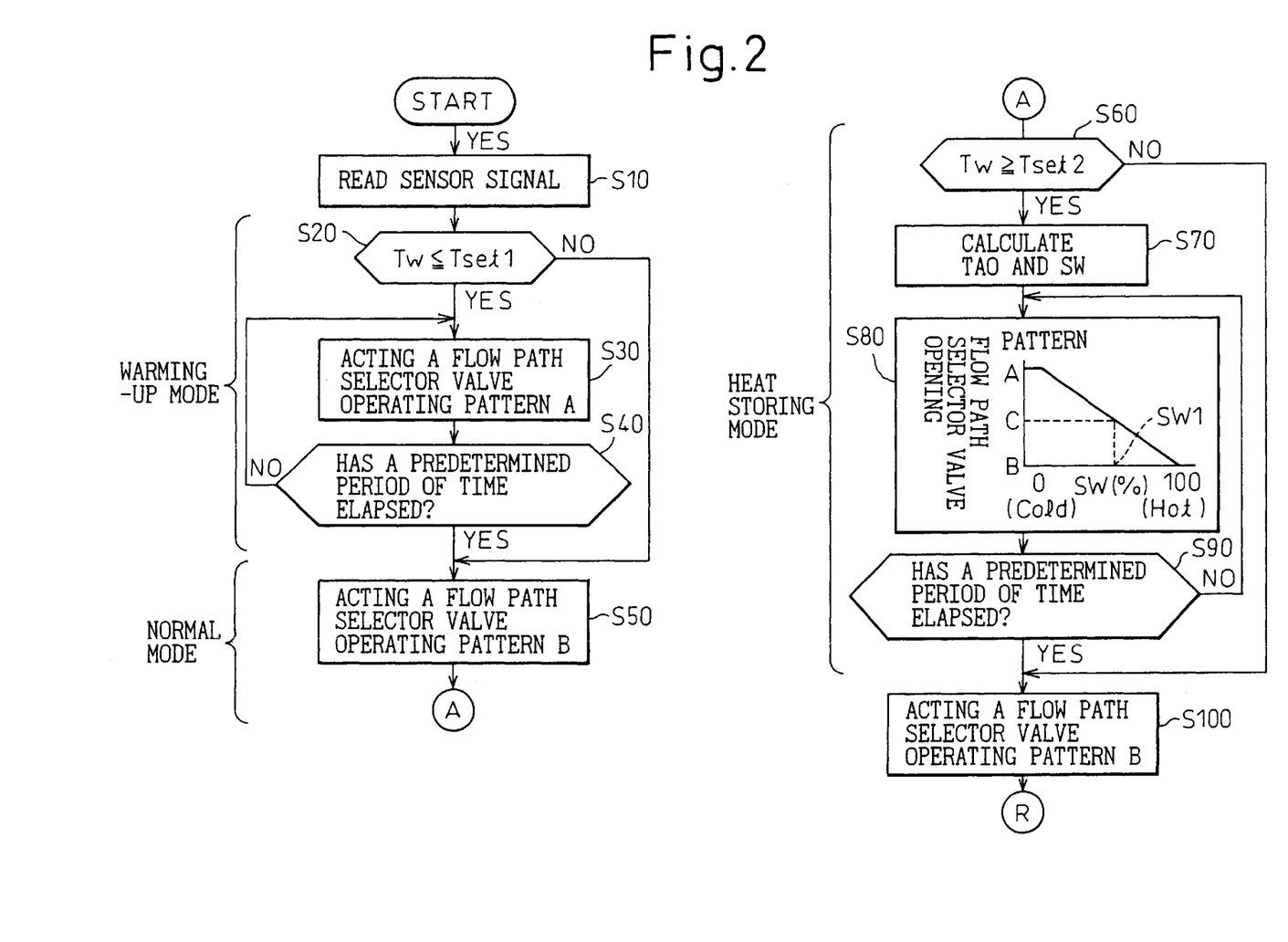
FIG. 2 shows a flowchart showing the operation of a flow path selector valve in the automotive internal combustion engine cooling system according to the embodiment of the present invention.

Next, the operation of the flow path selector valve 9 of the automotive internal combustion engine cooling system according to the embodiment of the invention that is constructed as has been described above will be described by reference to a flowchart shown in FIG. 2.

Firstly, in step S10, signals are inputted from respective sensors, which are not shown. Here, the respective signals are those indicating engine cooling water temperature, outside air temperature, volume of solar radiation, and room temperature. Next, in step S20, the cooling water temperature is determined. In case the engine cooling water temperature TW is equal to or lower than a preset first water temperature Tset 1, then the routine proceeds to step S30. This is because engine 1 needs warm-up. In case the engine cooling water temperature TW is higher than the first water temperature Tset 1, the routine proceeds to step S50 from step S20. This is because engine 1 does not need warm-up.

Figure 3:
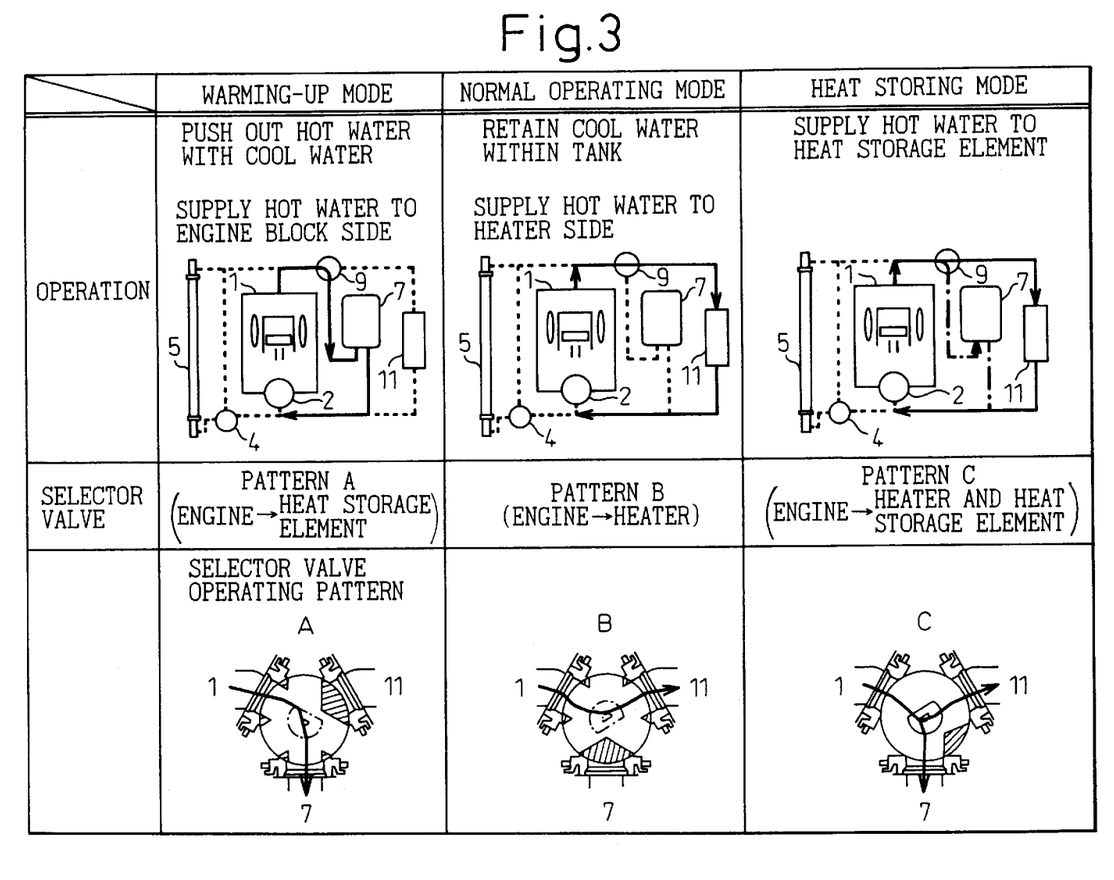
FIG. 3 shows typical samples of flows of hot water in the hot water circuit by type.

In step S30, the flow path selector valve 9 is put in an operating condition corresponding to a pattern A shown in a table in FIG. 3, where the flow path selector valve 9 is controlled such that hot water from the engine 1 is circulated only to the heat storage element 7. Next, proceeding to step S40, it is determined whether or not the flow path selector valve 9 has maintained the operation pattern A for a predetermined period of time. If the predetermined period of time has not elapsed, then return to step S30. In case the predetermined period of time is determined to have elapsed, then the routine proceeds to step S50.

The steps S20 to S40 constitute a warming-up mode for warming up the engine 1.

In step S50, the flow path selector valve 9 is put in an operating condition corresponding to a pattern B shown in the table in FIG. 3, where the hot water passage between the heat storage element 7 and the engine 1 is cut off, and a communication is established in the hot water passage between the engine 1 and the heater core 11 so as to produce a state in which hot water from the engine 1 can be circulated to the heater core 11.

This step S50 constitutes a normal mode for circulating hot water to the hot water circuit 3c.

Next, in step S60, whether or not the engine cooling water temperature TW is equal to or higher than a preset second water temperature Tset 2 is determined. In case the engine cooling water temperature TW is equal to or higher than the second water temperature Tset 2, then the routine proceeds to step S70. In any other cases, the routine proceeds to step S100 from step S60. In step S70, a required temperature at air outlets TAO which is required for air conditioning control and an air mixing opening SW for determining the opening of the air mixing door 12 are calculated.

Here, the required temperature at air outlets TAO and the air mixing opening SW are calculated from the following equation based on signals form the respective sensors.

$$TAO = Kset \cdot Tset - Kr \cdot Tr - Kam \cdot Tam - Ks \cdot ST + C \quad (1)$$

where, Kset, Kr, Kam, and Ks are constant which are set in advance, T set is a set temperature (such as to be set by the driver or passenger from a panel), Tr is a room temperature (detected by a room temperature sensor), Tam is an outside air temperature (detected by an outside air temperature sensor), ST is the volume of solar raditation, and C is a correction coefficient.

$$SW = [(TAO - TE)/(TW - TE)] \times 100(\%) \quad (2)$$

where, TE is a post evaporator temperature (detected by a post evaporator temperature sensor), and TW is a cooling water temperature (detected by a cooling water temperature sensor).

In step S70, the operating condition of the flow path selector valve 9 is determined according to an air mixing opening SW calculated by the equations (1) and (2).

As shown in step S80, in case the air mixing opening SW is 0<SW<100 (%), as the heater core 11 needs hot water, the operating condition of the flow path selector valve 9 is controlled according the air mixing opening SW value. If the value of the air mixing opening SW is relatively small or is equal to or smaller than an opening SW1, as only a small volume of hot water needs to be supplied to the heater core 11, the flow path selector valve 9 is allowed to operate in an operating condition between the pattern A and a pattern C, so that a large volume of hot water is supplied to the heat storage element 7 to thereby reduce a heat storage time.

If the air mixing opening SW is relatively large or exceeds the opening SW1, as a large amount of hot water needs to be supplied to the heater core 11, the flow path selector valve 9 is allowed to operate in an operating condition between the pattern C and the pattern B, so that a large volume of hot water is supplied to the heater core 11, while supplying hot water to the storage element 7 without deteriorating the performance of the air conditioning side.

On the other hand, if the air mixing opening SW is SW=100 (%), it is determined that as much hot water as possible needs to be supplied to the heater core 11 (a maximum hot condition), and the operating condition of the flow path selector valve 9 is put in the pattern B so that hot water is preferentially supplied only to the heater core 11 whereby, as hot water circulating the heater core 11 can be secured, a reduction in the flow rate of hot water flowing into the heater core 11 can be prevented that would otherwise be caused by hot water flowing into the heat storage element 7, thereby making it possible to maintain the temperature at the air outlets into the passenger compartment.

Next, the routine proceeds to step S90, and it is determined whether or not a predetermined period of time has elapsed since the operation of the flow path selector valve 9 was started. In case the predetermined period of time has not elapsed, then return to step S80. If the predetermined period of time has elapsed, the routine proceeds to step S100, where the operating condition of the flow path selector valve 9 is set to the pattern B.

The steps S60 to S90 constitute a heat storing mode for storing hot water in the heat storage element 7.

The table shown in FIG. 3 shows typical examples of flows of hot water in the hot water circuit 3c. In the warming up mode (steps S20 to S40 in FIG. 1), the operating condition of the flow path selector valve 9 is put in the pattern A, where hot water from the engine 1 is allowed to flow only into the heat storage element 7, whereby the engine 1 is warmed up by the hot water flowing into the heat storage element 7. As this occurs, cooling water (hot water) from the engine 1 is stored in the heat storage element 7 and then pushes out hot water stored therein to thereby replace the hot water stored therein.

In the normal operating mode (step S50 in FIG. 1), the operating condition of the flow path selector valve 9 is put in the pattern B, where as in the conventional hot water circuit, cooling water (hot water) from the engine 1 is circulated by way of the heater core 11 and is used to control air conditioning.

In the heat storing mode (step S60 to S90 in FIG. 1), the operating condition of the flow path selector valve 90 is put in the pattern C, where hot water from the engine 1 is allowed to pass through the hot water circuit 3c so as to be stored in the heat storage element 7, while hot water is circulated to the heater core 11. As this occurs, the volume of hot water that passes through the hot water circuit 3c and flows to the heater core 11 and the volume of cooling water (hot water), that passes through the heat storing bypass passage 6 and flows into the heat storage element 7, are controlled through the opening of the flow path selector valve 9 according to the air conditioning load conditions, whereby the heat storing performance can be ensured without deteriorating the air conditioning performance.

Functions and advantages which can be obtained from the automotive internal combustion engine cooling system according to the embodiment of the invention are described below.

Figure 4:
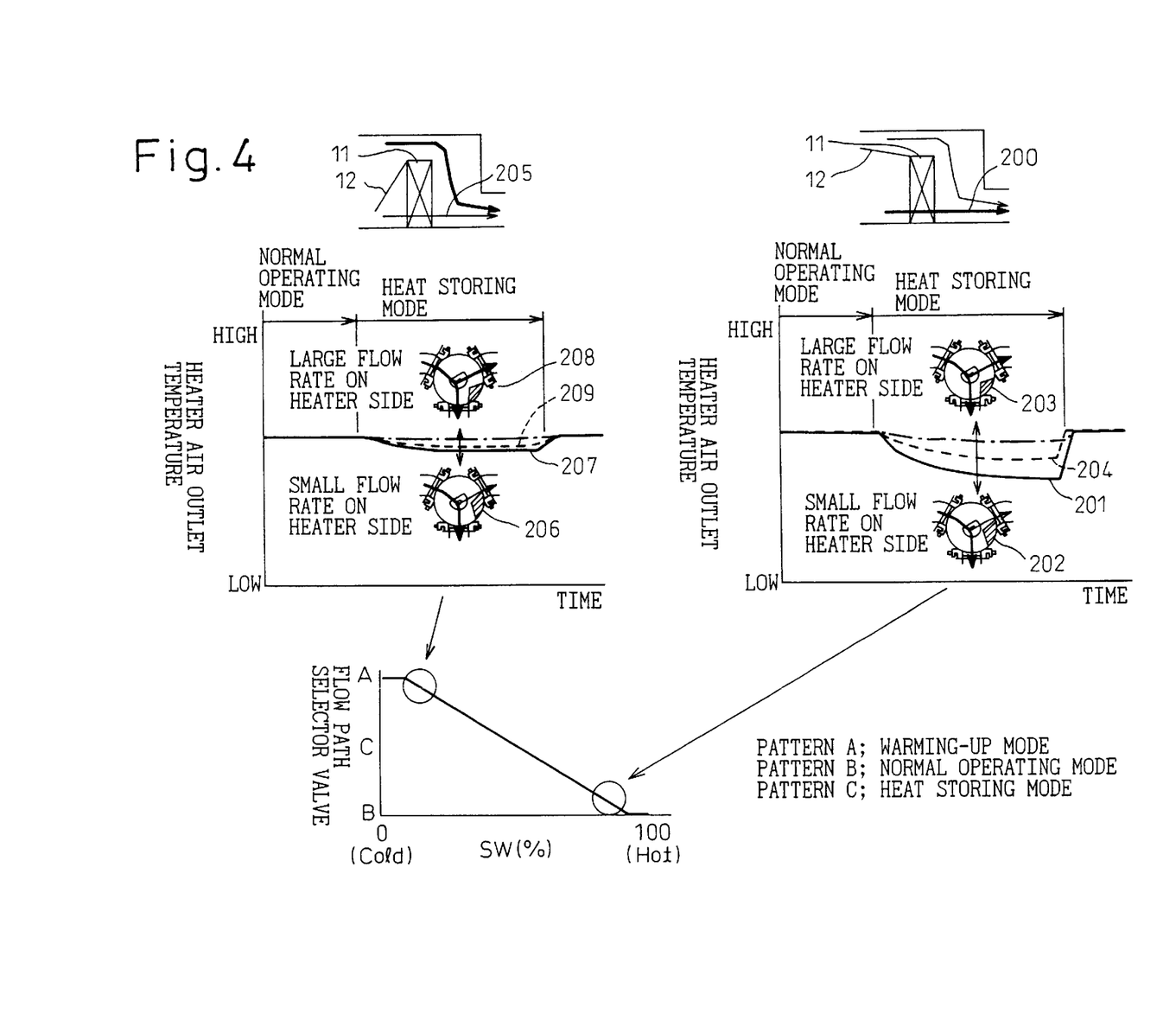
FIG. 4 shows typical samples of control of the flow path selector valve of the cooling system of the embodiment of the present invention.

FIG. 4 shows a control of the cooling systems of the embodiment of the invention.

As has been described above, when the operating patterns of the flow path selector valve 9 are changed over from the normal operating mode to the heat storing mode, the operating patterns of the flow path selector valve 9 are changed over from the pattern B to the pattern C. As this occurs, as hot water that has flowed only to the heater core 11 is also allowed to flow to the heat storage element 7, there may be a risk that the volume of hot water flowing to the heater core 11 is reduced and the temperature at air outlets is reduced. To deal with this risk, the flow rate of hot water needs to be controlled according to the air conditioning loads.

To be specific, in FIG. 4, when the air mixing opening SE of the air mixing door 12 is large (when the heating performance is largely needed), as the volume of air passing through the heater core 11 is large, if the volume of hot water circulating in the heater core 11 is reduced when the heat storing mode is attained, the temperature at air outlets is largely reduced. Consequently, in this case, the opening of the flow path selector valve 9 is controlled such that the volume of hot water distributed to the heater core 11 side becomes large, whereas the volume of hot water distributed to the heat storage element 7 side becomes small. Namely, by changing the opening 202 to an opening 203, a reduction in air outlet temperature is slowly reduced as indicated by a curve 204.

On the other hand, when the air mixing opening SW of the air mixing door 12 is small (when the heating performance is largely not needed), as the volume 205 of air that passes through the heater core 11 is reduced, even if the temperature of hot water circulating in the heater core 11 is reduced when the heat storing mode is attained, the temperature of air let out of the heater core 11 does not change largely. This is because the volume of air that does not pass through the heater core 11 is dominantly large. In this case, the opening of the flow path selector valve 9 is controlled to attain an opening 206 which allows the volume of hot water on the heater core 11 side to become small, whereas the volume of hot water that flows to the heat storage element 7 becomes large. Namely, in this state, even if the opening is made to be the opening 206, as the temperature at air outlets does not change largely from a temperature attained with an opening 209 resulting at the time of an opening 208, as in the case with an opening 207, even if the opening is controlled to be the opening 206, hot water is caused to flow to the heat storage element 7 in a larger volume.

In the control example shown in FIG. 4, while the operating patterns of the flow path selector valve 9 is controlled by the air mixing opening SW of the air mixing door 12, the flow path selector valve 9 may be controlled by the required temperature at air outlets TAO. In this case, as shown in FIG. 5, in case the required temperature at air outlets TAO is high, the opening of the flow path selector valve 9 is set to the pattern B so that a larger volume of hot water flows to the heater core 11, whereas in case the required temperature at air outlets TAO is low, the opening of the flow path selector valve 9 is set such that a smaller volume of hot water flows to the heater core 11.

Figure 6:
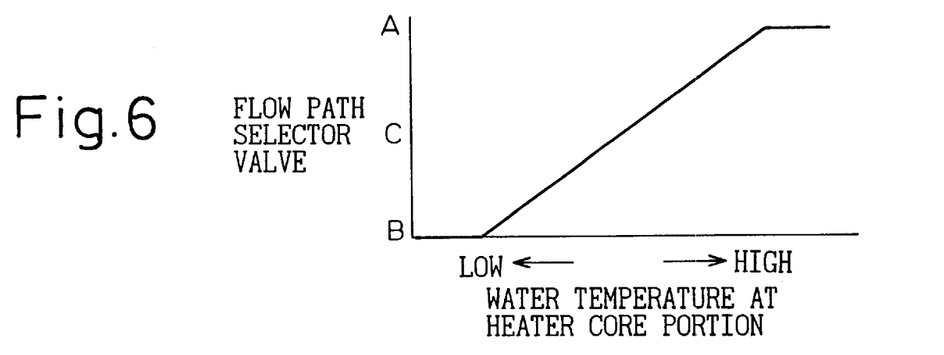
FIG. 6 shows a further example of control of the flow path selector valve.

Furthermore, in the control example shown in FIG. 4, while the operating patterns of the flow path selector valve 9 are controlled by the air mixing opening SW of the air mixing door 12, a water temperature sensor (not shown) may be provided at or in the vicinity of the heater core 11 so that the operating patterns of the flow path selector valve 9 are controlled by this water temperature sensor. In this case, a manual air conditioner in which air conditioning is not automatically controlled can also be controlled. As shown in FIG. 6, here, if the temperature of water in the heater core portion is detected as being low by the water temperature sensor, the opening of the flow path selector valve 9 is set to the pattern B side so that a larger volume of hot water is allowed to flow to the heater core 11, whereas if the temperature of water in the heater core portion is detected as being high by the water temperature sensor, the opening of the flow path selector valve 9 is set to the pattern A so that only a small volume of hot water is allowed to flow the heater core 11.

Figure 5:
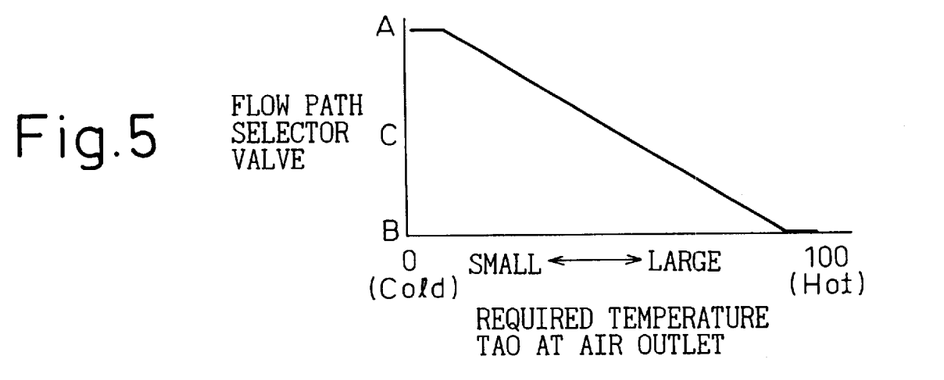
FIG. 5 shows another example of control of the flow path selector valve.
Figure 7:
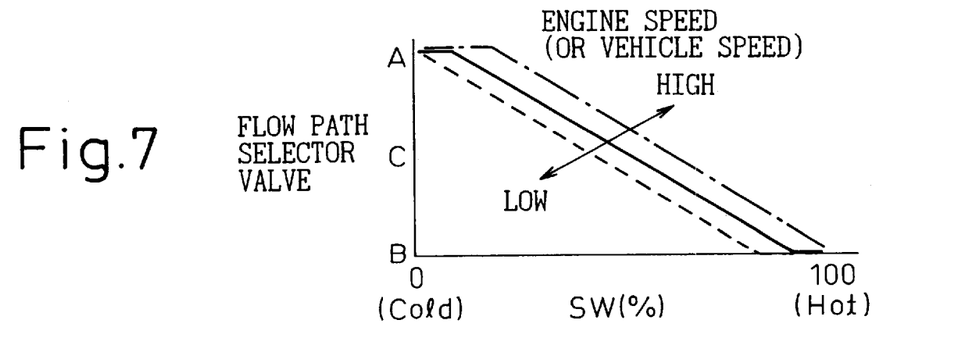
FIG. 7 shows an example of correction control of the flow path selector valve.

Furthermore, the operating conditions of the flow path selector valve 9 in the control examples shown in FIGS. 4, 5, 6 may be controlled and corrected by the engine speed. As shown in FIG. 7, if, in the event that the engine speed is fast, the opening of the flow path selector valve 9 is controlled such that a larger volume of hot water is allowed to flow the heat storage element 7 side by shifting the operating pattern of the flow path selector valve 9 to the operating pattern A side. In contrast, if the engine speed is slow, the opening of the flow path selector valve 9 is controlled such that a larger volume of hot water is allowed to flow to the heater core 11 side by shifting the operating pattern of the flow path selector valve 11 to the operating pattern B.

In addition, in the control sample shown in FIG. 7, while the operating conditions of the flow path selector valve 9 is corrected by the engine speed, the vehicle speed may be used to implement a correction control. As in FIG. 7, as this occurs, if the vehicle speed is fast, the opening of the flow path selector valve 9 is controlled such that an operating pattern of the flow path selector valve 9 which allows a larger volume of hot water to the heat storage element 7 side is selected whereas, if the vehicle speed is slow, the opening of the flow path selector valve 9 is controlled such that the operating pattern of the flow path selector valve 9 is selected which allows a larger volume of hot water to the heater core 11 side.

In addition, in the control examples shown in FIGS. 4 to 7, while the opening of the flow path selector valve 9 is controlled continuously, the opening may be controlled in a stepped fashion.

In the control example shown in FIG. 4, while the operating patterns of the flow path selector valve 9 are controlled by the air mixing opening SW of the air mixing door 12, the air mixing opening SW may be controlled by not using a value that is calculated by a control logic of an automatic air conditioner but by using a mechanical switch signal. For example, in a system such as a manual air conditioner which does not have a control logic, a maximum cooling switch may be used instead for control. In this case, when the maximum cooling switch is switched on, the operating pattern of the flow path selector valve 9 is shifted to the pattern A, whereas when the maximum cooling switch is switched off, the operating pattern of the flow path selector valve 9 is shifted to the pattern C.

Figure 8:
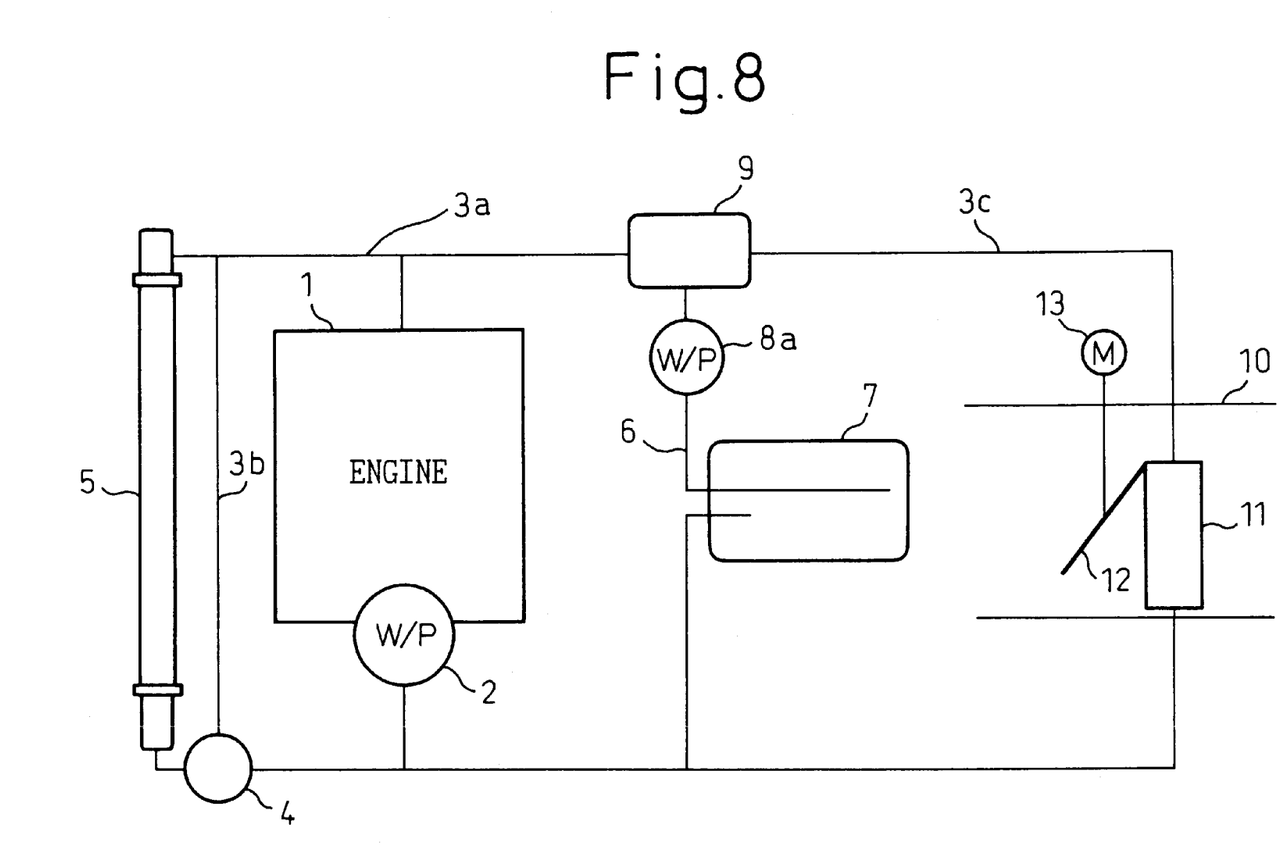
FIG. 8 shows an engine cooling water circuit and a hot water circuit of an automotive heat storage type heating device in an automotive internal combustion engine cooling system according to another embodiment of the present invention.

FIG. 8 shows an engine cooling water circuit 3a and a hot water circuit 3c of an automotive heat storage type heating device in an automotive internal combustion engine cooling system according to another embodiment of the present invention. In this embodiment, in addition to the construction of the aforesaid embodiment shown in FIG. 1, a heat storing electric water pump 8a is installed in a heat storage element bypass passage 6. The other parts of the construction remain the same as those of the previous embodiment. Namely, in this embodiment, the flow rate of hot water distributed to a heat storage element 7 is controlled through the operation of the heat storing electric water pump 8a.

Figure 9:
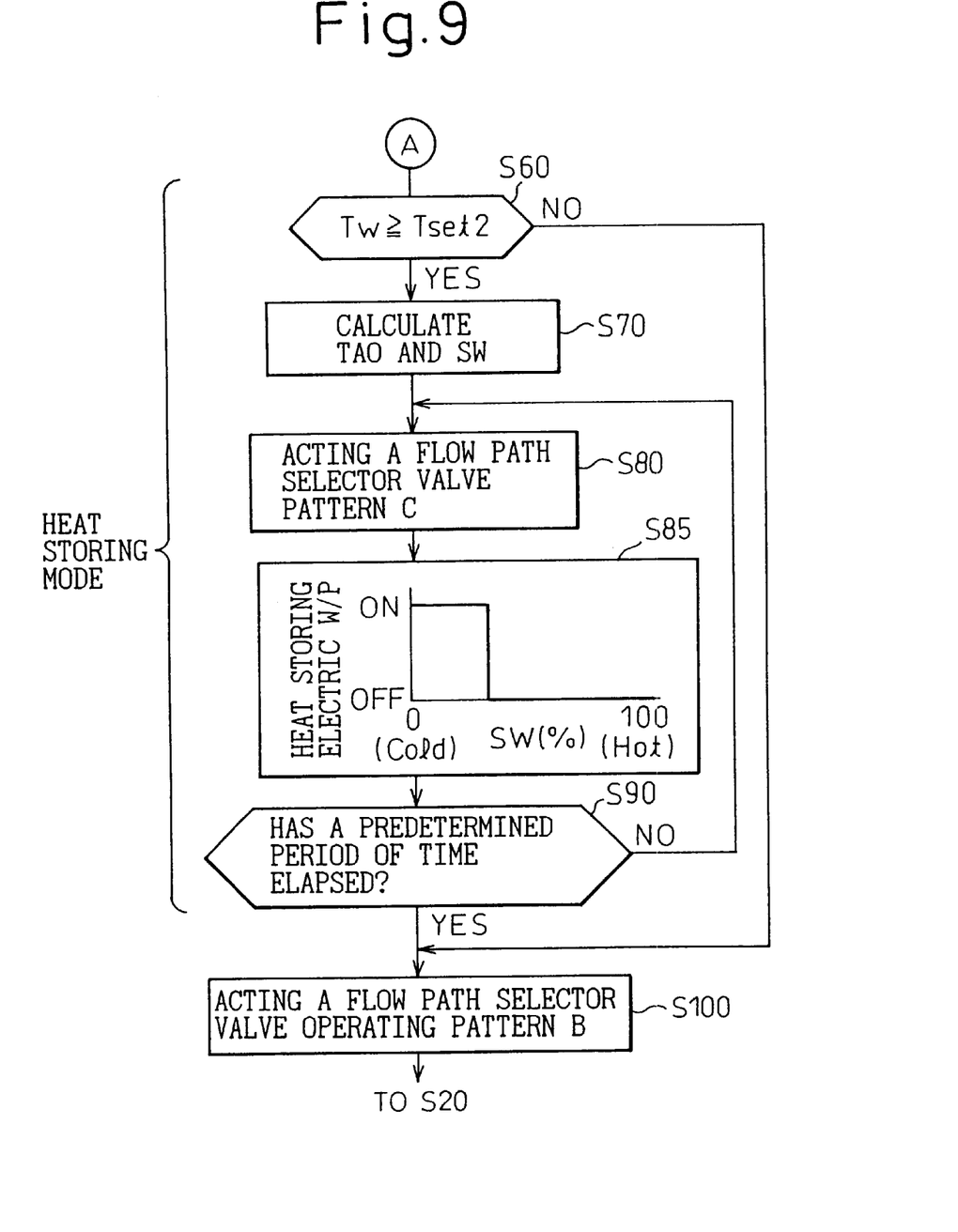
FIG. 9 shows a part of a flowchart showing the operation of a flow path selector valve in the automotive internal combustion engine cooling system according to the above embodiment of the present invention.

FIG. 9 shows a flowchart of the operation of a flow path selector valve 9 in the automotive internal combustion engine cooling system of the second embodiment. As the warming-up mode and normal operating modes of the flow path selector valve 9 are identical to those described in the previous embodiment, FIG. 9 shows only a heat storing mode thereof. In this case, steps S60 and S70 are identical to those in FIG. 2. In step S80, the operating pattern of the flow path selector valve 9 is set to a pattern C, where hot water is allowed to flow into the heat storage element 7 and a heater core 11. Next, proceeding to step S85, if the air mixing opening SW of an air mixing door 12 is small, the heat storing electric water pump 8a is switched on, whereby hot water is allowed to flow into the heat storage element 7 and the temperature thereof is maintained. Steps S90, S100 are identical to those shown in FIG. 2, and if a predetermined period of time has elapsed since the operation of the flow path selector valve 9 was started, the operating pattern of the flow path selector valve 9 is shifted to a pattern B.

Figure 10:
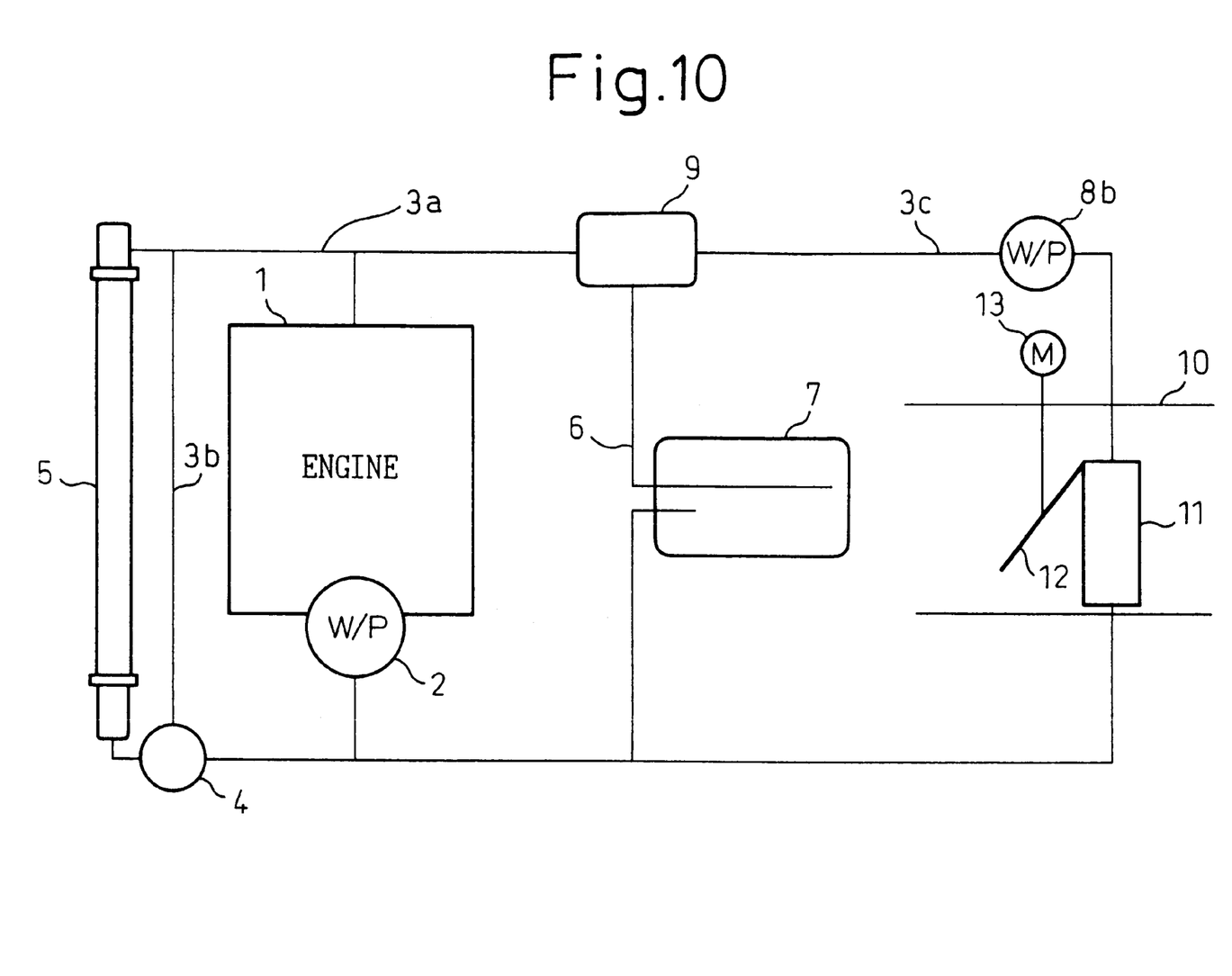
FIG. 10 shows an engine cooling water circuit and a hot water circuit of an automotive heat storage type heating device in an automotive internal combustion engine cooling system according to a further embodiment of the present invention.

FIG. 10 shows an engine cooling water circuit 3a and a hot water circuit 3c of an automotive heat storage type heating device in an automotive internal combustion engine cooling system according to a further embodiment of the present invention. In this embodiment, in addition to the construction of the aforesaid embodiment shown in FIG. 1, an electric water pump 8b for a heater is installed in the hot water circuit 3c to a heater core 11. The other parts of the construction remain the same as those of the embodiment shown in FIG. 1. Namely, in this embodiment, the flow rate of hot water distributed to the heater core 11 is controlled through the operation of the heater electric water pump 8b. This embodiment is effective, in particular, to vehicles such as hybrid vehicles and ecology-oriented vehicles that have an electric water pump for a heater, which is largely used on vehicles in which the engine is automatically stopped while at rest.

Figure 11:
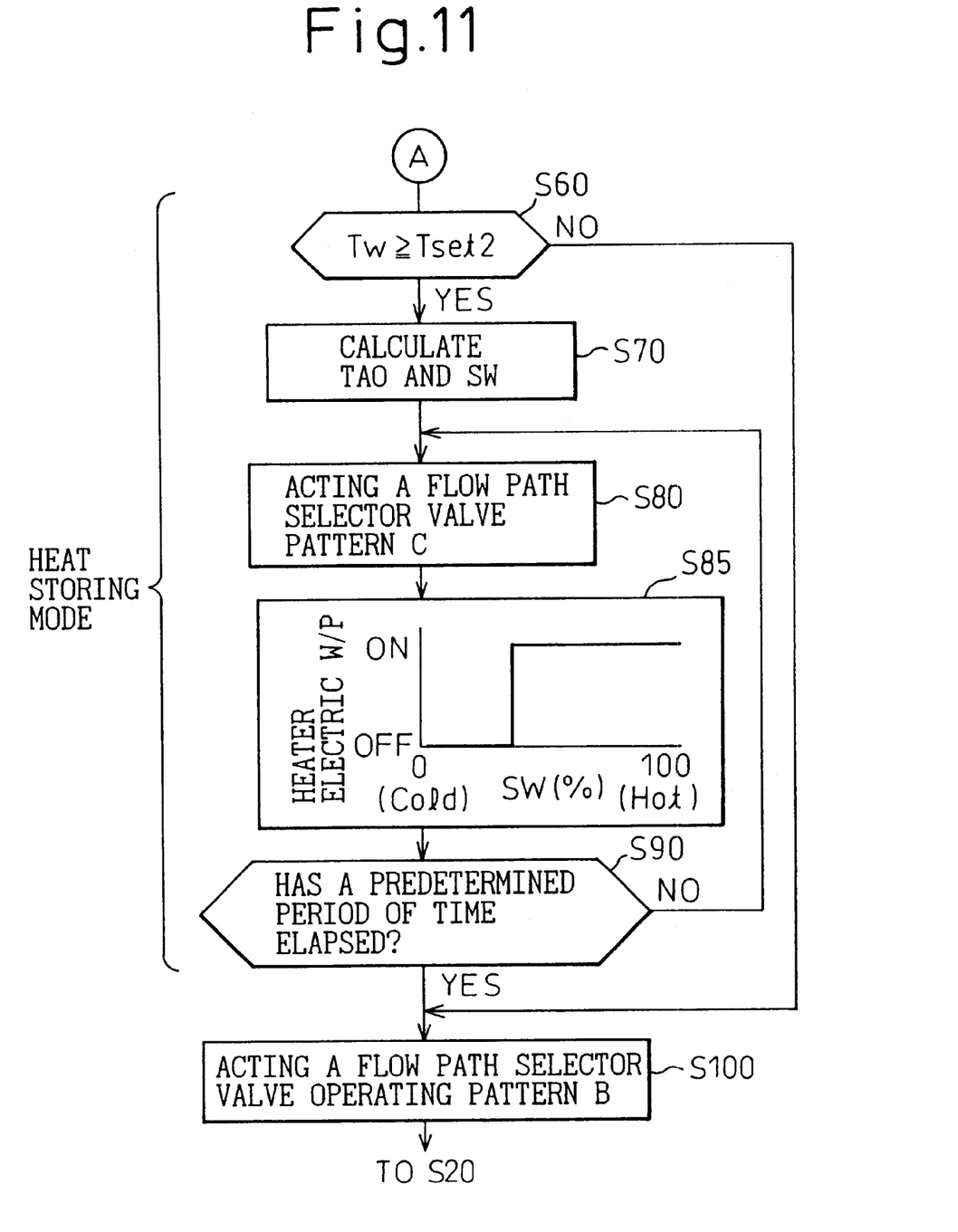
FIG. 11 shows a part of a flowchart showing the operation of a flow path selector valve in the automotive internal combustion engine cooling system according to the above embodiment of the present invention.

FIG. 11 shows part of a flowchart of the operation of a flow path selector valve 9 in the automotive internal combustion engine cooling system according to the further embodiment of the invention. As the warming-up mode and normal operating mode of the flow path selector valve 9 are identical to those of the previous embodiment shown in FIG. 2, only a heat storing mode thereof is shown. In this case, steps S60, S70 are identical to those shown in FIG. 2, and in step S80, the operating pattern of the flow path selector valve 9 is shifted to a pattern C, where hot water is allowed to flow to a heat storage element 7 and a heater core 11. Next, proceeding to step S85, if the air mixing opening SW of an air mixing door 12 is large, the heater electric water pump 8b is switched on so that a larger volume of hot water is allowed to flow into the heater core 11, whereby heat storage is made possible while maintaining the air conditioning performance. Steps S90, S100 are identical to those shown in FIG. 2, and if a predetermined period of time has elapsed since the operation of the flow path selector valve 9 was started, the operating pattern of the flow path selector valve 9 is shifted to a pattern B.

While the invention has been described by reference to the specific embodiments chosen for purposes of illustration, it should be apparent that numerous modifications could be made thereto by those skilled in the art without departing from the basic concept and scope of the invention.

What is claimed is:

1. An automotive internal combustion engine cooling system in which cooling water for a water-cooled internal combustion engine is designed to be circulated by means of a pump, the automotive internal combustion engine cooling system comprising;

a cooling water circuit in which cooling water circulates in a radiator adapted to cool cooling water from the internal combustion engine, a hot water circuit in which hot water circulates in a heater core adapted to heat air to be let out into a passenger compartment using hot water from the internal combustion engine as a heat source, an air mixing door for adjusting the volume of air which passes through the heater core, a heat storage element bypass passage for passing hot water into the heater core from the hot water circuit, a heat storage element installed in the heat storage element bypass passage for storing hot water supplied from the internal combustion engine, a flow path selector valve for adjusting the distribution of hot water to the heat storage element and the heater core, and a control unit for controlling the operation of the air mixing door and the flow path selector valve, wherein the control unit controls the flow path selector valve such that the flow rate of hot water to be distributed to the heater core is increased as the volume of air passing through the heater core increases.

2. An automotive internal combustion engine cooling system as set forth in claim 1, wherein the control unit controls the flow path selector valve such that the flow rate of hot water to be distributed to the heater core becomes larger than the flow rate of hot water to be distributed to the heat storage element when the volume of air passing through the heater core is equal to or larger than a predetermined volume.

3. An automotive internal combustion engine cooling system as set forth in claim 1, wherein the control unit controls the flow path selector valve such that the flow rate of hot water to be distributed to the heater core becomes zero when there exists almost no air to be distributed to the heater core.

4. An automotive internal combustion engine cooling system as set forth in claim 1, wherein the control unit has a computing device for computing a required temperature at air outlets temperature (TAO) which is a target temperature of air to be let out into the passenger compartment, and wherein the control unit controls the flow path selector valve according to the required temperature at air outlets (TAO), such that when the required temperature at air outlets exceeds a predetermined value, the flow rate of hot air to be distributed to the heater core becomes larger than the flow rate of hot water to be distributed to the heat storage element.

5. An automotive internal combustion engine cooling system as set forth in claim 1, wherein the control unit controls the flow path selector valve according to the temperature of hot water located in the vicinity of the heater core, such that when the temperature is higher than a predetermined value, the flow rate of hot water to be distributed to the heat storage element becomes larger than the flow rate of hot water to be distributed to the heater core.

6. An automotive internal combustion engine cooling system as set forth in claim 1, wherein the control unit controls the flow path selector valve according to the engine speed of the internal combustion engine, such that when the engine speed is lower than a predetermined engine speed, the flow rate of hot water to be distributed to the heater core becomes larger than the flow rate of hot water to be distributed to the heat storage element.

7. An automotive internal combustion engine cooling system as set forth in claim 1, wherein the control unit controls the flow path selector valve according to the vehicle speed of a vehicle, such that when the vehicle speed is slower than a predetermined vehicle speed, the flow rate of hot water to be distributed to the heater core becomes larger than the flow rate of hot water to be distributed to the heat storage element.

8. An automotive internal combustion engine cooling system as set forth in claim 1, wherein a heat storing electric water pump is provided in the heat storage element bypass passage for passing hot water to the heat storage element, and wherein the control unit controls the heat storing electric water pump such that when the volume of air passing through the heater core is equal to or smaller than a predetermined value, the flow rate of hot water to be distributed to the heat storage element becomes larger than the flow rate of hot water to be distributed to the heater core.

9. An automotive internal combustion engine cooling system as set forth in claim 1, wherein an electric water pump for a heater is provided in a passage for passing hot water to the heater core, and wherein the control units controls the electric water pump for a heater such that when the volume of air passing through the heater core is equal to or larger than a predetermined value, the flow rate of hot water to be distributed to the heater core becomes larger than the flow rate of hot water to be distributed to the heat storage element.

10. An automotive internal combustion engine cooling system as set forth in claim 2, wherein that the volume of air is equal to or larger than the predetermined value means that an opening degree of an air mixing door which controls a volume of air passing through the heater core is equal to or larger than a predetermined opening.

* * * * *